United States Patent
Reed et al.

[19]

[11] Patent Number: 5,978,459
[45] Date of Patent: Nov. 2, 1999

[54] ENCRYPTION OF TELEPHONE CALLING CARD CODES

[75] Inventors: Elaine Reed, Vienna; Kevin McMahon, Herndon, both of Va.

[73] Assignee: MCI Communications Corporation, Washington, D.C.

[21] Appl. No.: 08/580,207

[22] Filed: Dec. 28, 1995

[51] Int. Cl.⁶ .................................................. H04M 17/00
[52] U.S. Cl. ...................... 379/145; 379/112; 379/91.01; 379/93.02; 379/144; 380/24; 380/23; 235/380
[58] Field of Search .................................. 379/112, 114, 379/144, 145, 95, 91, 201, 222, 91.01, 91.02, 93.02, 93.06, 93.12, 93.15, 355, 356, 357; 380/3, 4, 30, 23, 24; 340/825.33, 825.34, 825.35; 235/375, 380, 382, 384, 385

[56] References Cited

U.S. PATENT DOCUMENTS

| | | | |
|---|---|---|---|
| 4,162,377 | 7/1979 | Mearns | 179/18 D |
| 4,924,514 | 5/1990 | Matyas et al. | 380/24 |
| 5,146,067 | 9/1992 | Sloan et al. | 235/381 |
| 5,379,344 | 1/1995 | Larsson et al. | 380/23 |
| 5,406,619 | 4/1995 | Akhteruzzaman et al. | 379/95 |
| 5,479,494 | 12/1995 | Clitherow | 379/144 |
| 5,481,611 | 1/1996 | Owens et al. | 380/25 |
| 5,511,114 | 4/1996 | Stimson et al. | 379/114 |
| 5,617,470 | 4/1997 | DePasquale | 379/114 |
| 5,657,389 | 8/1997 | Houvener | 370/825.34 |
| 5,661,807 | 8/1997 | Guski et al. | 380/25 |
| 5,673,316 | 9/1997 | Auerbach et al. | 380/4 |

OTHER PUBLICATIONS

"Phone Card Fraud–Reduction Method," *IBM Technical Disclosure Bulletin*, vol. 38, No. 3, p. 185, Mar. 1995.

Robrock II, "The Intelligent Nework–Changing the Face of Telecommunications," *Proceedings of the IEEE*, vol. 79, No. 1, pp. 7–20, Jan. 1991.

*Primary Examiner*—Curtis A. Kuntz
*Assistant Examiner*—Binh K. Tieu

[57] ABSTRACT

A cost-efficient method that utilizes encryption techniques to prevent the unauthorized use of telephone customer calling card account and personal identification numbers (access codes), by electronic telephone network eavesdroppers and telephone company employees. The access codes are encrypted by the telecommunications carrier's access code collection device. The encrypted access codes are subsequently used instead of the clear-text access codes in all subsequent transmissions and subsequent processes that make use of access codes including billing and printing of calling card access codes.

20 Claims, 4 Drawing Sheets

ENCRYPTION OF TELEPHONE CALLING CARD CODES

BACKGROUND OF THE INVENTION

1. Field of the Invention

The present invention relates generally to telecommunications and more particularly to security techniques including cryptography within a telecommunications network.

2. Related Art

The emergence of telephone company calling cards have caused significant changes to the way many telephone company customers make phone calls while away from the home or office. The burdensome practice of rounding up large quantities of coins needed for long distance calls has been alleviated by the use of telephone calling cards.

Today, calling card customers originating calls from typical public facilities need not deposit even a single coin. The process of making calls using a calling card includes entering an account number and a personal identification number or "PIN" into a telephone key pad device. This enables a calling card customer to make one or more calls from that location. Charges for those calls are subsequently billed to the customer's calling card account. Calling cards can also be used to avoid having to pay additional surcharges when making calls from certain public facilities such as hotels or the like.

Unfortunately, along with the conveniences and other advantages brought about by the advent of telephone calling cards, significant problems have arose. Calling card account numbers along with valid PINs, (the combination of which is to be hereinafter referred to as "calling card access codes"), have become valuable commodities to persons in our society that have a propensity for theft and fraud. It is well known that a modern crime has arisen that thrives on the sale of illegally obtained calling card access codes.

Typically, once calling card access codes are illegally obtained they are rapidly communicated to a multitude of people that use or sell telephone services activated or enabled by the use of the stolen codes. Generally, many calls are completed by the time the telephone company discovers the misuse and deactivates the stolen access codes. Consequently, the telecommunications industry has reported substantial revenues losses based on theft and fraudulent misuse of telephone access codes.

Account numbers by themselves are generally not regarded as confidential. They usually comprise the area code and telephone number of the calling card account customer. However, the Personal identification number (usually comprised of 4 digits) is considered confidential. It is the combination of the account number and the PIN that is particularly vulnerable to misuse as discussed herein.

Several methods have been used to misappropriate calling card access codes from unsuspecting calling card users. One type of misappropriation may be termed out-of-network theft, and a second type, in-network theft. The present invention relates to the prevention of the latter type. However it is useful to describe the former in order to clearly understand the problem.

Out-of-network theft involves direct interaction with calling card customers. This can be accomplished either by stealing the physical card itself, or by simply examining a card that contains an account number and PIN directly on its face. Alternatively, a thief can obtain the same information by eavesdropping on a calling card customer (which is often accomplished with the aid of high powered surveillance equipment), and capturing the sequence of numbers as they are entered into the telephone keypad.

Out-of-network theft may have subsided somewhat due a general awareness of the problem and various solutions thereof. However, this and other types of calling card access code theft remains to be a significant problem and a continuous revenue loss for the telecommunications industry.

In-network theft is achieved by extracting calling card access codes after they have been entered into the telephone network. This can occur by two different methods. The first method is undertaken by individuals known as "hackers" who engage in electronic eavesdropping of the telephone network. The hackers covertly and illegally attach computer equipment to the telephone network for the purpose of capturing the signals therein. Valuable calling card access codes are included in many network transmission signals as they are being routed across the network for billing purposes, validation purposes and the like. These codes are extracted and used to defraud the telephone company as discussed herein.

The second method of in-network theft occurs within the telephone companies themselves. Calling card access codes are vulnerable to theft by telephone company insiders due to the large number of employees that have access to the codes as part of their regular employment. This leads to security problems which may be difficult and expensive to control.

A solution to in-network theft is to use cryptography techniques to encrypt calling card access codes prior to transporting them across the telephone network. The access codes are subsequently decrypted only within secure internal telephone company computer systems. Only the encrypted versions of the telephone access codes are transported over the telephone network, thereby preventing in-network theft by hackers.

However, a solution that involves conventional encryption/decryption techniques presents several problems. First, it requires multiple iterations of the encryption/decryption process because access to the codes are generally required on numerous occasions and at numerous sites, throughout the call and billing cycle. Consequently the implementation of encryption/decryption techniques may require changes to many methods and procedures used by a telecommunications carrier.

Second, the solution requires the maintenance, management and security of "encryption keys". An encryption key, as the name implies, is the key to deciphering an encrypted message. Clearly, the security of any encryption scheme is only as good as the security of the encryption keys themselves. Consequently, conventional methods of encryption/decryption techniques require a significant amount of overhead for encryption key management and security. Finally, this solution only addresses in-network theft perpetrated by telephone company hackers. Since only the encrypted codes are transported over the telephone network, in-network theft caused by hackers as discussed herein is effectively prevented. However, in-network theft perpetrated by telephone company employees are not resolved by conventional encryption/decryption techniques because valuable decrypted access codes are still accessible to many telephone company employees.

SUMMARY OF THE INVENTION

This invention relates to a method and apparatus to prevent in-network theft of telephone calling card access codes. In-network theft is defined as the misappropriation of calling card access codes by telephone company employees and electronic telephone network eavesdroppers, also known as hackers. Calling card clear-text (i.e. non-encrypted) access codes are encrypted by a telecommunications carrier at the time they are received by the calling card service provider's equipment. Once the service provider encrypts the clear-text access code into an encrypted access code, the encrypted versions are used instead of the clear-text versions in all subsequent transmissions by the service provider. This feature of the present invention prevents in-network theft by hackers. Moreover, encrypted access codes are used instead of the clear-text access codes for all subsequent procedures and processes that use access codes within a telecommunications company. This feature of the present invention prevents in-network theft by telephone company employees.

Decryption of access codes are not necessary according to the present invention. Only encrypted versions are maintained by a service provide's internal computer data base systems and the like. Calling card telephone calls are enabled by comparing access codes after they are encrypted. These codes are compared with internal computer data base systems that have access to lists of valid encrypted access codes. Likewise, such telephone calls are billed using customer account and billing information provided by other internal computer data base systems that are keyed or indexed only by encrypted access codes and not clear-text versions. This feature of the present invention prevents in-network theft by telephone company employees.

Furthermore, the vast majority of current telecommunications procedures and processes relating to calling card access codes are maintained by merely substituting clear-text access codes with encrypted ones. Therefore, implementation of the present invention requires little or no modification to current telecommunication calling card procedures and processes.

FEATURES AND ADVANTAGES

The present invention prevents in-network theft of calling card access codes perpetrated by hackers and telephone company employees.

Additionally, the present invention prevents in-network theft of calling card access codes in a manner that is efficient, cost-effective and easy to implement by telecommunication companies.

Further, the present invention prevents in-network theft of calling card access codes in a manner that has little or no impact on current telecommunications operating procedures, methods and processes.

Still further, the present invention prevents in-network theft of calling card access codes without increasing security risks and overhead relating to the maintenance of security measures usually associated with encryption/decryption schemes.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the digit(s) to the left of the two rightmost digits in the corresponding reference number

DETAILED DESCRIPTION OF THE PREFERRED EMBODIMENTS

Figure 1:
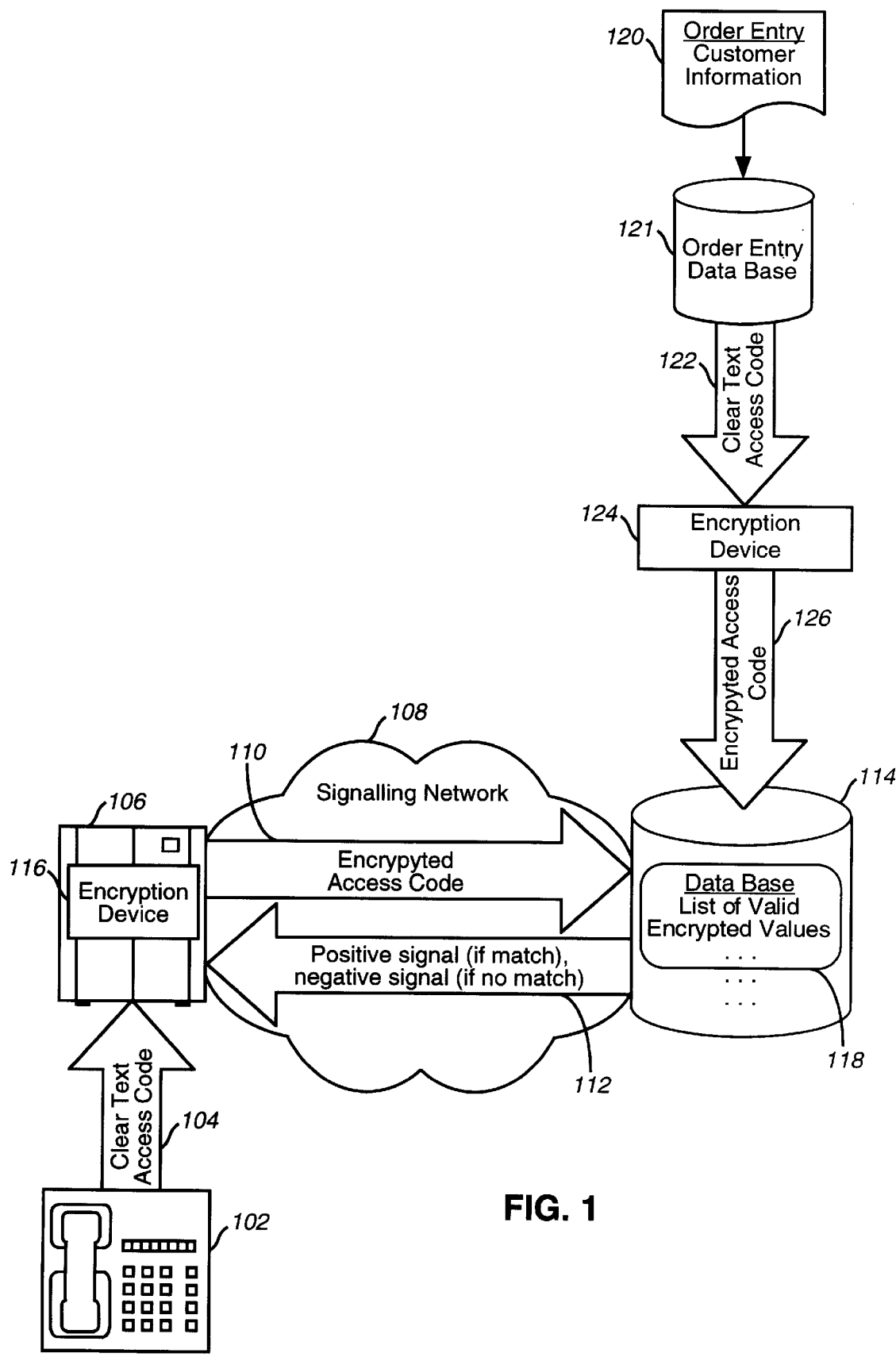
FIG. 1 is a block diagram of an arrangement of telecommunication systems used for implementing an embodiment of the present invention.

FIG. 1 is a block diagram of an arrangement of telecommunication systems used for implementing an embodiment of the present invention. A telephone calling card access code 104 is transmitted to switching device 106 by a telephonic device, such as telephone 102. Switching device 106 collects the clear-text access code 104 for further processing. Although a telecommunications switch 106 is shown in FIG. 1, other devices may be used in place of, or in addition to, switching device 106 for implementing the clear-text access code collection function.

For example, a Voice Recognition Unit (VRU) may be involved in the access code collection process. A VRU uses voice recognition techniques to recognize and accept voice input data from calling card customers when processing calling card telephone calls. Similarly, clear-text access codes are often collected manually by human operators. Therefore, the telecommunication switch 106 depicted in FIG. 1, is only an example of a device that functions to collect clear-text access codes from calling card customers, and should not be construed as a limitation of the present invention. Consequently, switch 106 is hereinafter referred to as an "access code collection device". The access code collection device 106 represents the aforementioned examples and other telecommunication devices used to implement the calling card access code collection function as described herein.

The access code collection device 106 has access to an encryption device 116. The encryption device 116 includes logic that functions to translate or encrypt the clear-text form of the calling card access code 104 into an encrypted access code 110. Encryption device 116 may be implemented either in hardware or computer software.

The encrypted access code 110 is transported over signaling network 108 to a computer system which includes a data base 114. Logic within data base computer system 114 functions to determine whether the encrypted access code is valid. In order to accomplish this task, data base computer system 114 includes a list of all valid encrypted access codes 118. Logic within data base computer system 114 compares the encrypted access code 110 with the list of valid encrypted access codes 118. If a match is found, a positive response 112 is sent from data base computer system 114, to access code collection device 106, thus enabling the telephone call originating from telephone 102. If a match between the encrypted access code 110 and the list of valid codes 118 is not found, a negative response 112 is sent and the call originating from telephone 102 is disabled.

The list of encrypted access codes 118 is entered into computer data base system 114 by an order entry organization. The order entry organization takes orders from customers for new services. The order entry organization sets up customer accounts including the assignment of clear-text access codes for calling card customers. Customer information 120 is entered into the order entry data base computer system 121.

After customer order information is entered into the order entry data base system 121, each clear text access code 122 is translated into an encrypted access code 126 via encryption device 124. Encryption device 124 functions identically to encryption device 116, and will be subsequently discussed herein with reference to FIGS. 2 and 4. The encrypted access codes are subsequently entered into the central computer data base system 114, which may be accessed by a plurality of access code card collection devices throughout the telephone network.

Note that encrypted access code 110 is not decrypted or deciphered by data base computer system 114. Indeed, encrypted access codes such as 110 are never decrypted or converted back into clear-text access codes such as 104, according to a preferred embodiment of the present invention. Because decryption is not necessary, the present invention may be implemented by a telecommunications carrier with only minor changes to current methods, procedures, and operations.

Figure 3:
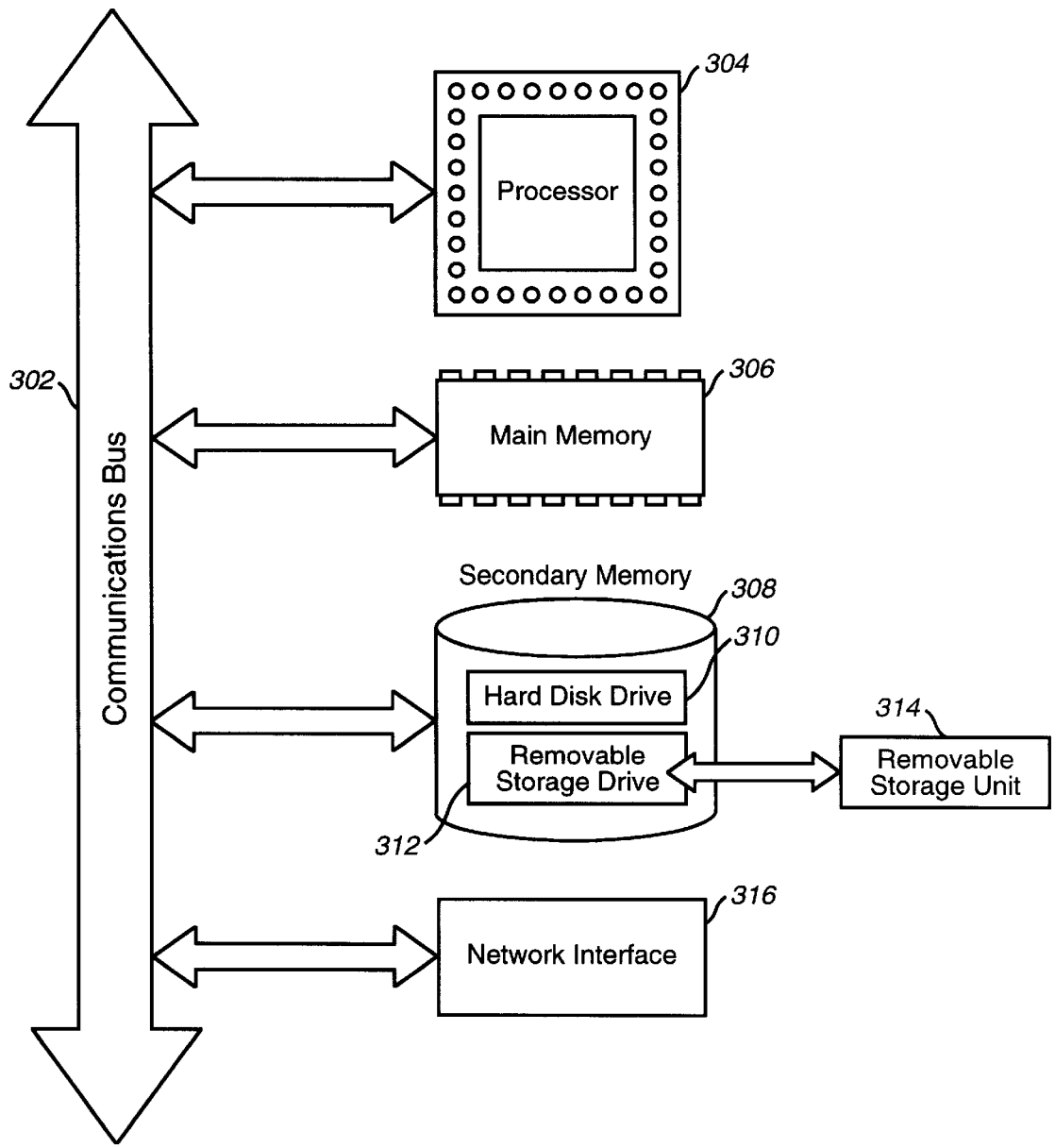
FIG. 3 is block diagram of a computer useful for implementing components of the present invention.

In one embodiment, encryption device 116 and 124, and/or data base computer systems 114 and 121, may each be embodied in a general computer system. An exemplary computer system 301 is shown in FIG. 3. The computer system 301 includes one or more processors, such as processor 304. The processor 304 is connected to a communication bus 302.

The computer system 301 also includes main memory 306, preferably random access memory (RAM), and a secondary memory 308. The secondary memory 308 includes, for example, a hard disk drive 310 and/or a removable storage drive 312, representing a floppy disk drive, a magnetic tape drive, a compact disk drive, etc. The removable storage drive 312 reads from and/or writes to a removable storage unit 314 in a well known manner.

Removable storage unit 314, also called a program storage device or a computer program product, represents a floppy disk, magnetic tape, compact disk, etc. As will be appreciated, the removable storage unit 314 includes a computer usable storage medium having stored therein computer software and/or data. Computer programs (also called controllers ) are stored in main memory and/or secondary memory 308. Such computer programs, when executed, enable computer system 301 to perform the features of the present invention discussed herein. In particular, the computer programs, when executed enable processor 304 to perform the features of the present invention. Accordingly, such computer programs represent controllers of computer system 301.

The computer system 304 also includes a network interface 316. Network interface 316 provides the necessary hardware and software required to enable two-way communications between computer system 301 and other devices attached to telephone network 108.

In another embodiment, the invention is directed to a computer program product comprising a computer readable medium having control logic (computer software) stored therein. The control logic, when executed by processor 304, causes processor 304 to perform the functions of the invention as described herein.

In another embodiment, the invention is implemented primarily in hardware using, for example, a hardware state machine. Implementation of the hardware state machine so as to perform these functions described herein will be apparent to persons skilled in the relevant art(s).

Figure 2:
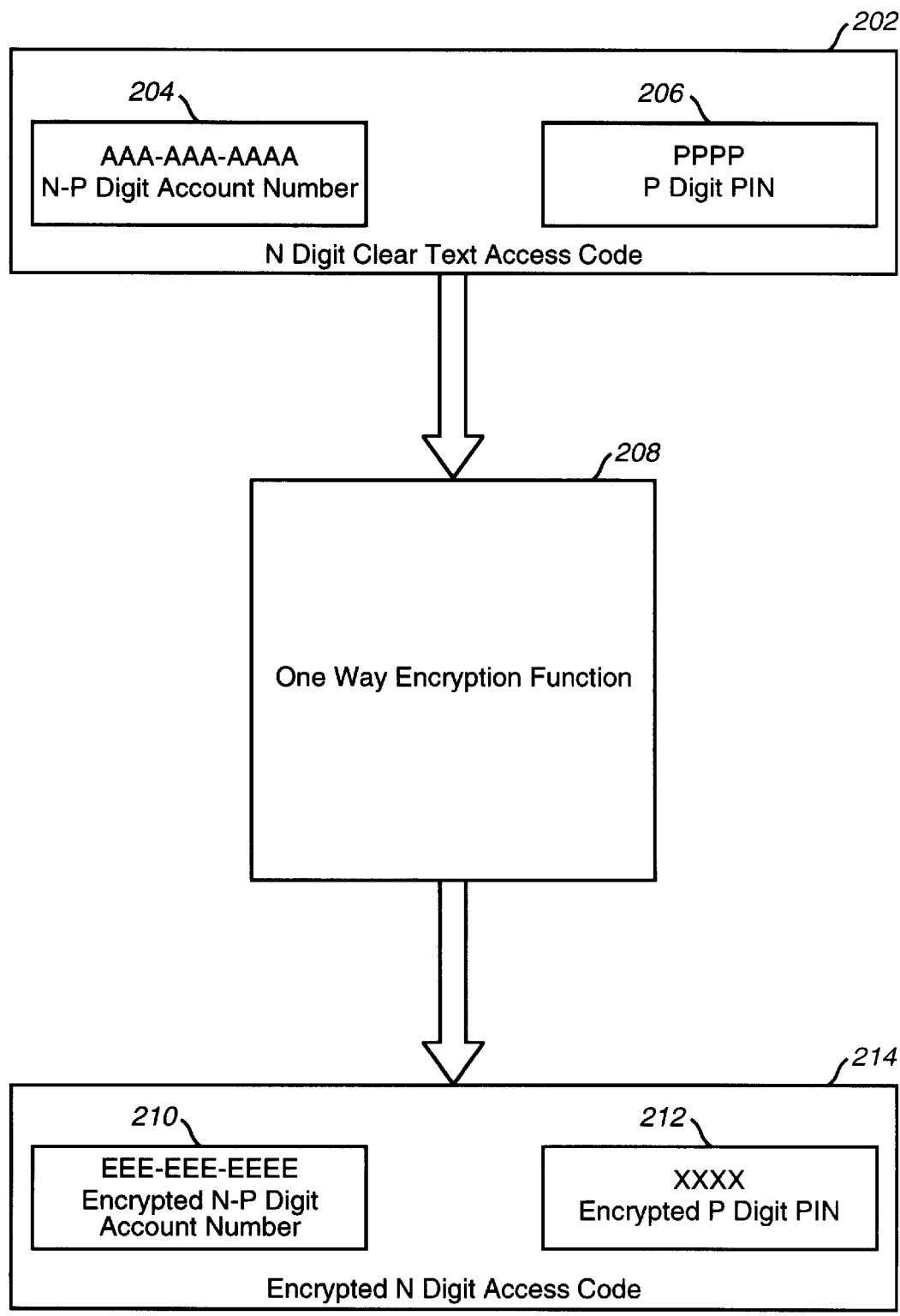
FIG. 2 is a flow diagram showing the input and output of a one-way encryption function according to the present invention.

Encryption device 116 and 124 are implementations of a one-way encryption function. FIG. 2. is a block diagram showing the input 202 and output 214 of one-way encryption function 208. One-way encryption function 208 represents an encryption technique that is irreversible. That is, once input data 202 is translated into output data 214, via one-way encryption function 208, there is no practical means available to translate output data 214 back into input data 202. Since the encrypted access codes are never decrypted according to a preferred embodiment of the present invention, an irreversible one-way encryption function 208 may be used. The implementation of such a one-way encryption function 208 is well known in the art.

Referring to FIG. 2, a clear-text, N digit calling card access code 202 is comprised of a N-P digit account number 204 and a P digit PIN 206. The calling card access code is input to the one-way encryption function 208. The output of one-way encryption function 208 is an encrypted N digit calling card access code 214. N digit encrypted access code 214 comprises an N-P digit encrypted account number 210 and a P digit encrypted PIN.

The details of one-way encryption function 208 will now be discussed with reference to FIG. 4. Output 214 of one-way encryption function 208 is achieved by two separate encryption sub-processes 216 and 218. Sub-process 216 has an N-P digit account number 204 as input to one-way encryption function 208. The output of one-way encryption function 208 is an encrypted N-P digit account number 210. Sub-process 218 has a complete N digit access code 202 as the input to one-way encryption function 208. The complete N digit access code 202 comprises a N-P digit account number 204 and a P digit PIN 202. The output of one-way encryption function 208 is an encrypted P digit PIN 212.

The encrypted N digit access code 214 comprises a combination of the outputs from sub-processes 216 and 218 respectively. Note that the first part of encrypted N digit access code 214 is an encrypted N-P digit account number 210. The encrypted N-P digit account number 210 is derived solely from the corresponding clear-text N-P digit account number 204.

Figure 4:
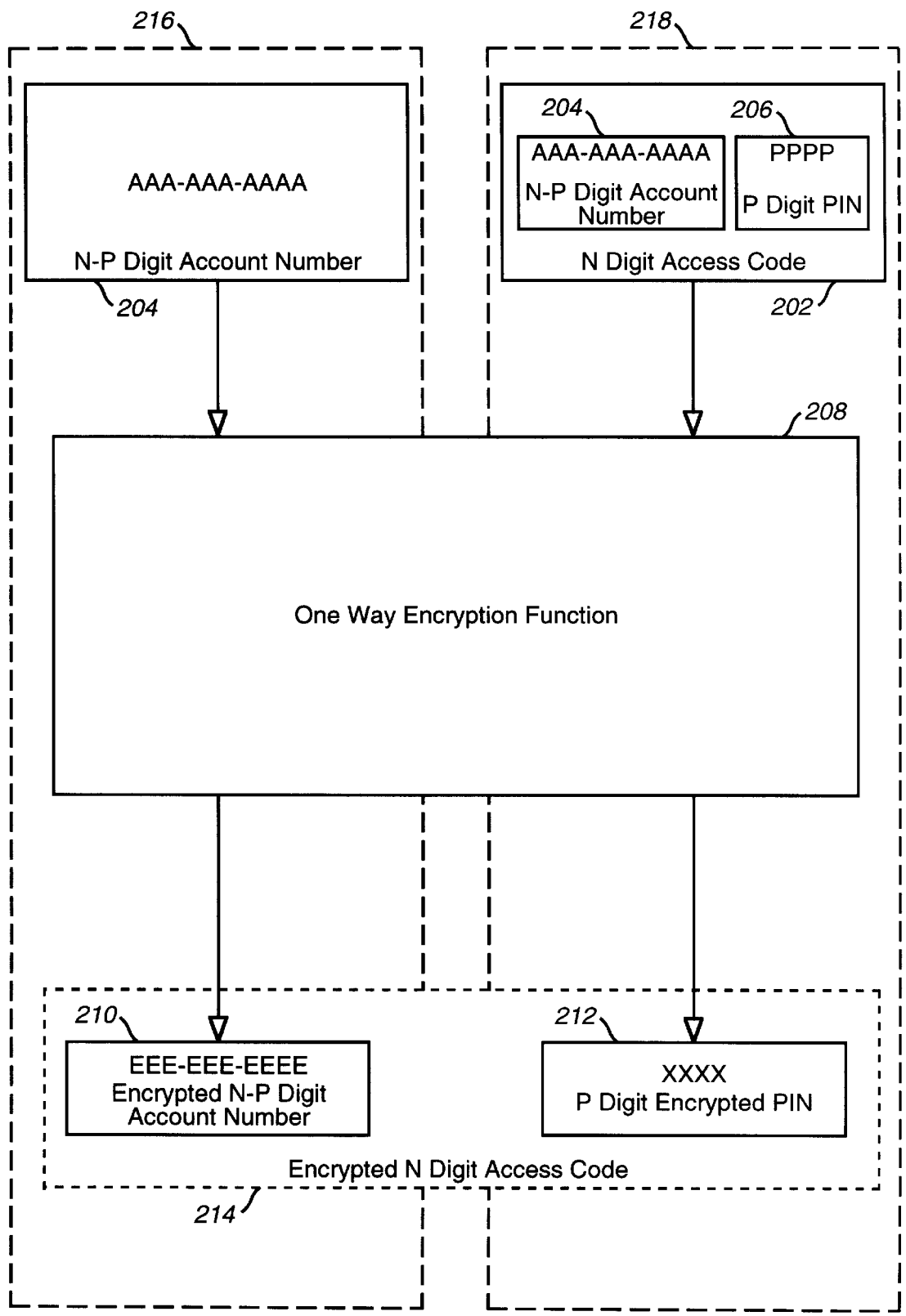
FIG. 4 is a flow diagram showing a more detailed view of the inputs and outputs of a one-way encryption function according to the present invention.

The two step process depicted in FIG. 4, which generates encrypted access code 214 by combining outputs 210 and 212 respectively, results in maintaining account number commonality. Account number commonality is maintained when clear-text access codes comprising common account numbers, yield encrypted access codes comprising common encrypted account numbers. Maintaining account number commonality enables a telecommunications company to process encrypted access codes in the same manner as clear digit access codes were previously processed, thereby eliminating the need to modify such processes. Processing of access codes are maintained at both the account number level and the PIN level.

For example, a corporation is assigned a plurality of calling cards for use by their employees. Each calling card has the same account number but a different PIN. The telecommunications carrier processes telephone calls made by the use such calling cards at both the PIN level and the account number level. Calling card access codes are processed at the PIN level for example, in order track and report individual calls made by particular employees. Calling card access codes are processed at the account level for example, for billing purposes such as the identity of the billing party (the corporation), and frequency of use discount rates, which are based on all calls made by employees of the corporation. It is therefore a feature of the present invention to maintain the commonality of account numbers for all encrypted access codes that are generated by calling cards having common account numbers. Likewise, it a feature of the present invention to maintain different PINs for all encrypted access codes generated by calling cards having the same account numbers but different PINs.

This feature of the present invention allows a telecommunications company to use encrypted access codes instead of clear-text access codes in all processes and procedures that make use of calling card access codes. For example, billing procedures that process access codes at both the account level and the PIN level may use the encrypted access codes in exactly the same manner as clear-text access codes were previously used. Likewise, encrypted calling card access codes are printed on customer bills instead of previously used clear-text calling card access codes. Finally, only encrypted calling card access codes are transmitted over the telephone network after the initial encryption take place. Accordingly, once clear-text access codes are converted into encrypted access codes by a carrier's access code collection device, such clear-text access codes are never again referred to by any system, person, or process within a telecommunications company. This includes all transmissions of access codes over the telephone network. Note that encrypted codes are completely worthless to would-be thieves since they cannot be used to originate telephone calls or services. Only clear-text calling card access codes will generate proper encrypted access codes that are used internally by the service provider to enable telephone calls based on calling card access codes.

For example, if a valid encrypted access code were to be used by a caller, the code would be encrypted a second time by the carrier's access code collection device. This would result in the generation of an invalid access code which cannot be used to enable any telephone services. In this way, the present invention completely eliminates in-network theft of calling card access codes perpetrated by both telephone network hackers and telephone company employees.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for preventing unauthorized use of a telephone calling card for accessing telecommunication services over a telephone network, said method comprising the steps of:
   (1) receiving, at an access code collection device, a clear-text calling card access code;
   (2) encrypting said clear-text calling card access code into an encrypted calling card access code;
   (3) accessing a computer data base system having a pre-defined list of valid encrypted calling card access codes;
   (4) comparing said encrypted calling card access code with said pre-defined list of valid encrypted calling card access codes; and
   (5) authorizing use of the telephone calling card if said encrypted calling card access code matches an entry in said pre-defined list of valid encrypted calling card access codes.

2. The method of claim 1, further comprising the step of using said encrypted calling card access code instead of said clear-text access code in subsequent telephone network transmissions.

3. The method of claim 1, further comprising the step of entering an encrypted calling card access code into said predefined list of valid encrypted calling card access codes, pursuant to a new order entry for a telephone calling card account.

4. The method of claim 1, wherein said clear-text calling card access code is N digits in length, comprising a clear-text P digit PIN and a clear-text N-P digit account number.

5. The method of claim 4, wherein step (2) further includes:
   (a) generating as a first output, an encrypted N-P digit account number from a first input comprising said clear-text N-P digit account number;
   (b) generating as a second output, an encrypted P digit PIN from a second input comprising said clear-text N digit access code;
   (c) generating an N digit encrypted access code by combining said first output with said second output, wherein all of said N digit encrypted access codes being generated by clear-text access codes having common account numbers, have common encrypted account numbers, and all said N digit encrypted access codes being generated by clear-text access codes having common account numbers and different PINs, have common encrypted account numbers and different encrypted PINs.

6. The method of claim 1 further comprising the step of using said encrypted calling card access code instead of said clear-text calling card access code, in subsequent telecommunications carrier processes and procedures.

7. An apparatus for preventing unauthorized access to telephone calling card access codes calls that are transmitted over a telephone signaling network, and used to enable telephone calls, the apparatus comprising:
   an encryption device coupled to an access code collection device, wherein said encryption device creates an encrypted calling card access code from a clear-text access code;
   a computer data base system connected to said originating switch, said computer data base system including a pre-defined list of valid encrypted calling card access codes;
   means coupled to said computer data base system, for comparing said encrypted calling card access code with said pre-defined list of valid encrypted calling card access codes; and
   means for enabling the telephone call, if said encrypted calling card access code matches one of the entries in said list of pre-defined valid encrypted calling card access codes.

8. The apparatus of claim 7, further comprising a means for transmitting said encrypted calling card access code instead of said clear-text access code in subsequent transmissions over the telephone network.

9. The apparatus of claim 7, further comprising a means for processing said encrypted calling card access code instead of said clear-text access code for subsequent telecommunications processing.

10. A computer program product, comprising a computer useable medium having computer program logic stored therein, said computer program logic for enabling a computer to prevent unauthorized use of telephone calling cards for accessing telecommunication services over a telephone network,
   wherein said computer program logic comprises:
      means for enabling the computer to receive, at an access code collection device, a clear-text calling card access code;

means for enabling the computer to encrypt said clear-text calling card access code into a encrypted calling card access code;

means for enabling the computer to access a computer data base system having a pre-defined list of valid encrypted calling card access codes;

means for enabling the computer to compare said encrypted calling card access code with said pre-defined list of valid encrypted calling card access codes; and means for enabling the computer to authorize the use of the telephone calling card if said encrypted calling card access code matches an entry in said pre-defined list of valid encrypted calling card access codes.

11. The computer program logic of claim 10, wherein said computer program logic further comprises:

means for enabling the computer to transmit said encrypted calling card access code instead of said clear-text access code over the telephone network in subsequent telephone network transmissions.

12. The computer program logic of claim 10, wherein said computer program logic further comprises:

means for enabling the computer to enter an encrypted a calling card access code into said predefined list of valid encrypted calling card access codes, pursuant to a new order entry for a telephone calling card account.

13. The computer program logic of claim 10, wherein said computer program logic further comprises:

means for enabling the computer to process clear-text calling card access codes having N digits comprising a clear-text P digit PIN and a clear-text N-P digit account number.

14. The computer program logic of claim 13, wherein said computer program logic further comprises:

means for enabling the computer to generate as a first output, an encrypted N-P digit account number, from a first input comprising said clear-text N-P digit account number;

means for enabling the computer to generate as a second output, an encrypted P digit PIN, from a second input comprising said clear-text N digit access code;

means for enabling the computer to generate an N digit encrypted access code by combining said first output with said second output, wherein all of said N digit encrypted access codes being generated by clear-text access codes having common account numbers, have common encrypted account numbers, and all said N digit encrypted access codes being generated by clear-text access codes having common account numbers and different PINs, have common encrypted account numbers and different encrypted PINs.

15. A system for preventing unauthorized use of a telephone calling card for accessing telecommunication services over a telephone network, comprising:

a database, having stored therein a predefined list of valid encrypted calling card access codes;

an access code collection device configured to receive a clear-text calling card access code;

an encryption device having as an input, said clear-text calling card access code, and having as an output, an encrypted calling card access code;

means for accessing said database;

means for comparing said encrypted calling card access code with said predefined list of valid encrypted calling card access codes in said database; and means for authorizing use of the telephone calling card if said encrypted calling card access code matches an entry in said pre-defined list of valid encrypted calling card access codes.

16. The system of claim 15, further comprising a means for using said encrypted calling card access code instead of said clear-text access code in subsequent telephone network transmissions.

17. The system of claim 15, further comprising a means for entering an encrypted calling card access code into said database pursuant to a new order entry for a telephone calling card account.

18. The system of claim 15, wherein said clear-text calling card access code is N digits in length, comprising a clear-text P digit PIN and a clear-text N-P digit account number.

19. The system of claim 18 wherein said input comprises a first input and a second input, said first input comprising said clear-text N-P digit account number and said second input comprising said clear-text N digit access code, said encryption device further includes:

means for generating as a first output, an encrypted N-P digit account number from said first input;

means for generating as a second output, an encrypted P digit PIN from said second input;

means for generating an N digit encrypted access code by combining said first output with said second output, wherein all of said N digit encrypted access codes being generated by clear-text access codes having common account numbers, have common encrypted account numbers, and all said N digit encrypted access codes being generated by clear-text access codes having common account numbers and different PINs, have common encrypted account numbers and different encrypted PINs.

20. The computer program logic of claim 10, wherein said computer program logic further comprises:

means for enabling the computer to use said encrypted calling card access code instead of said clear-text calling card access code, in subsequent telecommunications carrier processes and procedures.

* * * * *